United States Patent [19]

Tateishi et al.

[11] Patent Number: 4,563,225

[45] Date of Patent: Jan. 7, 1986

[54] AMORPHOUS ALLOY FOR MAGNETIC HEAD AND MAGNETIC HEAD WITH AN AMORPHOUS ALLOY

[75] Inventors: Hiroshi Tateishi, Kanagawa; Masakatsu Haga, Tokyo, both of Japan

[73] Assignee: Tokyo Shibaura Denki Kabushiki Kaisha, Kawasaki, Japan

[21] Appl. No.: 573,408

[22] Filed: Jan. 24, 1984

[30] Foreign Application Priority Data

Mar. 31, 1983 [JP] Japan .................................. 58-53769

[51] Int. Cl.[4] .............................................. C04B 35/00

[52] U.S. Cl. ................................ 148/31.55; 148/403; 420/435

[58] Field of Search ............................. 148/403, 31.55; 420/435

[56] References Cited

U.S. PATENT DOCUMENTS

| | | | |
|---|---|---|---|
| 4,236,946 | 12/1980 | Aboaf et al. | 148/31.55 |
| 4,306,908 | 12/1981 | Takayama et al. | 148/403 |
| 4,464,208 | 8/1984 | Tateishi | 148/31.55 |

FOREIGN PATENT DOCUMENTS

| | | | |
|---|---|---|---|
| 0048888 | 4/1982 | European Pat. Off. | 148/403 |
| WO81-00861 | 4/1981 | PCT Int'L Appl. | 148/403 |

*Primary Examiner*—John P. Sheehan

*Attorney, Agent, or Firm*—Oblon, Fisher, Spivak, McClelland & Maier

[57] ABSTRACT

An amorphous alloy for a magnetic head has a composition which may be represented as $$Co_{100-T-X-Y-Z}Ni_THf_XB_YSi_Z,$$

where T, X, Y and Z satisfy the conditions of $0.75 \leqq T \leqq 14$, $6 \leqq X \leqq 15$, $3 \leqq Y \leqq 8$, $0 \leqq Z \leqq 0.01$, $3 \leqq Y+Z \leqq 13$, and $11 \leqq X+Y+Z \leqq 25$. Such an amorphous alloy has a high crystallization temperature, said temperature being higher than 500° C., and does not lower the effective magnetic permeability, even if gradual cooling is performed after heat treatment. A magnetic head having a core consisting of such an amorphous alloy is not deteriorated in its magnetic properties, even if the head is made by glass bonding.

6 Claims, No Drawings

AMORPHOUS ALLOY FOR MAGNETIC HEAD AND MAGNETIC HEAD WITH AN AMORPHOUS ALLOY

BACKGROUND OF THE INVENTION

The present invention relates to an amorphous alloy which is used as a core material for a magnetic head, and a magnetic head with an amorphous alloy.

In magnetic heads conventionally used for magnetic recorders/reproducers, a highly magnetic permeable material having a crystalline structure is employed, such as an Fe-Ni alloy (Permalloy) or an Fe-Si-Al alloy (Sendust). However, the Fe-Ni alloy has a disadvantage, in that its wear resistance is low; and, although the Fe-Si-Al alloy has good wear resistance, it also had disadvantages, in that its mechanical strength, brittleness and plastic processing capacity is low.

The amorphous alloy having no crystalline structure, such as a Co-Fe-Ni-Si-B alloy, has recently been identified as an ideal material for a magnetic head. Such amorphous alloys have excellent magnetic properties, such as high saturation magnetization and low magnetostriction, along with high mechanical strength, good wear resistance and good processing capacity.

However; in general, the magnetic head used for a VTR (video tape recorder) must be stably and rigidly. Therefore, especially the core halves of the magnetic head of a VTR are normally secured each other with a glass adhesive to form the gap. The glass bonding process involved requires heat treatment at a temperature higher than 400° C., and a gradual cooling after heat treatment. However, the amorphous alloys all have their respective crystallization temperatures; and the magnetic properties and, particularly, the effective magnetic permeability of the amorphous alloy are deteriorated by heat treatment at a temperature in the vicinity of the crystallization temperature. Further, the conventional low magnetostriction amorphous alloys contain at least two or more of the magnetic elements comprised of Co, Fe and Ni. Consequently, an induction magnetic anisotropy is produced by the heat treatment, and the magnetic properties of the amorphous alloys are thereby deteriorated. Thus, the conventional amorphous alloys have disadvantages, in that the practicability of using them for the magnetic head of a VTR is low.

Thus, there is a present need for an amorphous alloy whose magnetic properties do not deteriorate after glass bonding; i.e., for an amorphous alloy which has a crystallization temperature higher than the temperature necessary for a glass bonding heat treatment (i.e., higher than 500° C.), whose magnetic properties do not deteriorate, even with the gradual cooling which occurs after heat treatment. If only one of the magnetic elements is contained in the amorphous alloy, the deterioration, after gradual cooling, of the effective magnetic permeability of an amorphous alloy having this composition can be prevented. However, such an amorphous alloy has certain disadvantages, in that the requirements for high saturation magnetization and low magnetostriction cannot be satisfied.

As described above, a magnetic head with an amorphous alloy bonded by a glass adhesive is not yet provided, which magnetic head has high saturation magnetization and low magnetostriction and maintain a high level of effective magnetic permeability.

SUMMARY OF THE INVENTION

A primary object of the present invention is to provide an amorphous alloy for a magnetic head, which alloy has excellent magnetic properties, such as high saturation magnetization and low magnetostriction.

Another object of the present invention is to provide an amorphous alloy for a magnetic head, which alloy has a crystallization temperature higher than 500° C. and undergoes no deterioration of its magnetic properties, such as its effective magnetic permeability, even in a heat treatment combined with a gradual cooling.

Still another object of the present invention is to provide a magnetic head which exhibits excellent magnetic properties, without lowering its effective magnetic permeability, even if a core composed of an amorphous alloy having high saturation magnetization and low magnetostriction is subjected to a glass bonding heat treatment.

According to the present invention, an amorphous alloy for a magnetic head is provided, which alloy has a composition represented by the following formula:

$$Co_{100-T-X-Y-Z}Ni_THf_XB_YSi_Z,$$

where T, X, Y and Z respectively represent the atomic density of elements Ni, Hf, B and Si, and satisfy the following inequalities:

$$0.75 \leqq T \leqq 14 \quad (1)$$

$$6 \leqq X \leqq 15 \quad (2)$$

$$3 \leqq Y \leqq 14 \quad (3)$$

$$0 \leqq Z \leqq 11 \quad (4)$$

$$3 \leqq Y+Z \leqq 13 \quad (5)$$

$$11 \leqq X+Y+Z \leqq 25 \quad (6)$$

DETAILED DESCRIPTION OF THE PREFERRED EMBODIMENTS

An amorphous alloy for a magnetic head according to the present invention comprises a substance represented by the following formula:

$$Co_{100-T-X-Y-Z}Ni_THf_XB_YSi_Z,$$

where T, X, Y or Z represent the atomic density of the element Ni, Hf, B or Si in the amorphous alloy. In this case, the composition of the amorphous alloy is so determined that the T, X, Y and Z factors are contained within the ranges of contents represented by the following inequalities:

$$0.75 \leqq T \leqq 14 \quad (1)$$

$$6 \leqq X \leqq 15 \quad (2)$$

$$3 \leqq Y \leqq 14 \quad (3)$$

$$0 \leqq Z \leqq 11 \quad (4)$$

$$3 \leqq Y+Z \leqq 13 \quad (5)$$

$$11 \leqq X+Y+Z \leqq 25 \quad (6)$$

The reasons for requiring the above respective elements and the reasons for limiting the composition of the alloy, as above, may be explained in greater detail, with reference to the present invention.

An amorphous alloy according to the present invention mainly comprises a cobalt (Co). Among such alloys, an amorphous alloy having a saturation magnetization higher than 7 KGauss and low magnetostriction ($\lambda_s$)($|\lambda_s| \leq 10^{-6}$) can be readily obtained.

The nickel (Ni) is contained in the amorphous alloy because the Ni serves to raise the crystallization temperature of the alloy and lower the magnetostriction. The atomic density T of the Ni is so set as to satisfy the above formula (1); since, if the atomic density T is lower than 0.75 and higher than 14, the adding effect of the Ni cannot be readily obtained. The Ni has the effect of enhancing the crystallization temperature and also increasing the magnetic permeability of the amorphous alloy. In this case, the effect of enhancing the magnetic permeability can be preferably obtained within the above range of atomic density.

The hafnium (Hf) is contained in the amorphous alloy according to the present invention because the Hf has the effect of raising the crystallization temperature of the alloy. The atomic density X of Hf is so set as to satisfy the above formula (2); since, if the X is lower than 6, a crystallization temperature higher than 500° C. cannot be obtained and, similarly, if the X is higher than 15, a crystallization temperature higher than 500° C. cannot be obtained and it will be difficult to raise the saturation magnetization level of the alloy above 7 KGauss.

The boron (B) is contained in the amorphous alloy of the invention because the B has the effect of aiding in the formation of the amorphous alloy and improving the physical properties of the alloy. The atomic density Y of the B is so set as to satisfy the above formula (3); since, if the Y is lower than 3, the effect of aiding in the formation of the amorphous alloy with the B is lessened and, if the Y is higher than 14, the rust resistance of the alloy deteriorates and brittleness is produced. It is preferable to set the atomic density Y of the B lower than 8; since, if the atomic density Y of the B is less than 8, the production of the amorphous alloy is facilitated and its wear resistance can be improved.

The addition of the silicon (Si) is effective in aiding the formation of the amorphous alloy. In this case, the atomic density Z of the Si is so set as to satisfy the above formula (4). The formation of the amorphous alloy can be performed by including another element, such as B, even if the Si is not contained in the alloy. Further, the atomic density Z of the Si is so set as to be lower than 11; since, if it is higher than 11, the effect of forming the amorphous alloy by the addition of the Si is lessened.

To obtain an amorphous alloy which has high saturation magnetic flux density and low coercive force; and, yet, does not have its effective magnetic permeability lowered, said amorphous alloy should not contain the Si. However, when the atomic density Z of the Si is set within a range of from 0 to 0.01, an alloy can be obtained which has magnetic properties substantially similar to an alloy having no Si. Therefore, it is preferable to set the atomic density Z of the Si within a range of from 0 to 0.01.

The atomic densities X, Y, Z of the Hf, B and Si are so set as to satisfy the above formulae (5), (6). If the total addition amount of the B and Si is lower than 3 at atomic density Y+Z, the formation of the amorphous alloy is rendered difficult; and, if higher than 13, an alloy having a magnetic permeability higher than 5,000 (in 1 KHz) cannot be obtained. When the total addition amount of the Hf, B and Si is lower than 11 at atomic density X+Y+Z, the crystallization temperature of the alloy is decreased to a level lower than 500° C.; and, when higher than 25, the saturation magnetic flux density is decreased to a level lower than 7 KGauss, with the result that an actual problem occurs in the material used for the magnetic head.

The amorphous alloy which contains the composition described above is produced by the steps of preparing powders of Co, Ni, Hf, B and Si (as required) at a predetermined ratio, melting them, and forming the molten metals into an amorphous alloy by e.g., a liquid quenching method or a sputtering method. In this case, the amorphous alloy may be heat treated, as required.

A magnetic head can be produced from the core material which is obtained by machining the amorphous alloy in a predetermined shape. A rotary magnetic head device for a VTR can be constructed by mountaining the magnetic head on a rotor; or, a rotary magnetic head device might also be constructed by a thin film forming technique, by directly forming a core at a rotor and further forming a coil pattern.

The amorphous alloy according to the present invention has a high saturation magnetization level and a crystallization temperature level higher than 500° C., and does sustain no decrease in its effective magnetic permeability, even if a heat treatment process with the gradual cooling needed for glass bonding is carried out to make a head tip. Therefore, a magnetic head which has excellent electromagnetic conversion properties, and magnetic properties such as a high saturation magnetization level, a low magnetostriction level, high effective magnetic permeability, high mechanical strength and high wear resistance can be obtained by fabricating the head from the amorphous alloy of the present invention.

Some examples of the invention may be described as follows, in conjunction with comparative examples. In Table, Examples 1 to 4 and Comparative Examples 1 to 6 of the Ni-series amorphous alloy are listed.

TABLE 1

| | Composition | Crystallization Temperature (°C.) | Effective Magnetic Permeability (5 MHz) | Coercive Force (Oe) | Saturation Magnetic flux Density (KG) | Wear Amount (μm/100 hour) |
|---|---|---|---|---|---|---|
| Example | No. 1 $(Co_{0.97}Ni_{0.03})_{75}Hf_{13}Si_2B_{10}$ | 620 | 400 | 0.04 | 7.0 | 3.0 |
| | No. 2 $(Co_{0.95}Ni_{0.05})_{78}Hf_{12}Si_4B_6$ | 650 | 350 | 0.05 | 8.0 | 1.0 |
| | No. 3 $(Co_{0.97}Ni_{0.03})_{78}Hf_{11}B_{11}$ | 580 | 550 | 0.02 | 8.5 | 3.0 |
| | No. 4 $(Co_{0.90}Ni_{0.10})_{82}Hf_{12}B_6$ | 600 | 600 | 0.01 | 9.2 | 1.0 |
| Comparative Example | No. 1 $(Co_{0.94}Fe_{0.06})_{78}Si_8B_{14}$ | 380 | 50 | 2.0 | 9.0 | 10.0 |
| | No. 2 $(Co_{0.95}Ni_{0.05})_{75}Hf_8Si_5B_{12}$ | 570 | 200 | 0.3 | 7.2 | 4.0 |
| | No. 3 $(Co_{0.95}Ni_{0.05})_{73}Hf_{11}Si_3B_{13}$ | 600 | 200 | 0.3 | 5.0 | 5.0 |

TABLE 1-continued

| Composition | Crystallization Temperature (°C.) | Effective Magnetic Permeability (5 MHz) | Coercive Force (Oe) | Saturation Magnetic flux Density (KG) | Wear Amount (μm/100 hour) |
|---|---|---|---|---|---|
| No. 4 $Co_{82}Hf_{12}B_6$ | 590 | 150 | 0.3 | 9.4 | 1.0 |
| No. 5 $(Co_{0.90}Ni_{0.10})_{73}Hf_{16}Si_2B_9$ | 480 | 50 | 1.5 | 4.5 | 3.0 |
| No. 6 Mn—Zn Ferrite | | 500 | 0.15 | 4.5 | 3.0 |

Amorphous alloys of the compositions listed in Table were respectively prepared by a liquid quenching method. More particularly, thin strip specimens of an amorphous alloy, which were 30 μm thick and 12 mm wide, were produced by injecting the molten alloys of the above compositions on the surface of a sole roll rotating at a high rate of speed in an argon gas atmosphere through argon gas under pressure (0.1-1.0 $Kg/cm^2$) from the nozzle of a quartz tube; and by then quenching the alloys. The specimens in Comparative Example 1 contained no Hf; the specimens in Comparative Example 2 contained B and Si, so that the total amount Y+Z of the atomic densities of the B and Si exceeded 13; Comparative Example 3 contained Hf, B and Si, so that the total amount X+Y+Z of the atomic densities exceeded 25; Comparative Example 4 contained Hf but no Ni; and Comparative Example 5 contained Hf, so that the atomic density X of the Hf exceeded 15.

Comparative Example 6 employed an Mn-Zn ferrite of the head material which is currently used in domestic VTRs. General data, excepting the crystallization temperatures, was listed in Table.

The following properties were measured, as below, for the thin strip specimens. General data, excepting the crystallization temperature, for the Comparative Example 6 were also measured.

(i) Crystallization Temperature

The crystallization temperatures were measured by a differential thermal analyzer, in such a manner that the temperatures were determined by the heat starting temperature of the heating peak initially presented during the period of temperature rise.

(ii) Effective Magnetic Permeability

The thin strip specimens were punched in a ring shape, having a 10 mm outer diameter and an 8 mm inner diameter, and ten sheets of the specimens were laminated via interlayer insulators, i.e. sputtered films of soda glass having a softening point of 380° C. Then, after the laminate was heat treated at 500° C. to 530° C. for 30 min., it was gradually cooled at a rate of 3° C. per minute, and laminated cores were obtained. The laminated cores of the amorphous alloy were respectively wound with 30 turns of primary and secondary coils, the inductances were measured by an impedance meter, and the effective magnetic permeability μ' levels were obtained by calculation. The effective magnetic permeabilities were at the 5 MHz levels for the Ni-series amorphous alloy.

(iii) Coercive Force and Saturation Magnetic Flux Density

The coercive forces and saturation magnetic flux densities were obtained by using specimens similar to those used in measuring the effective magnetic permeability, and by obtaining a DC magnetization curve with an automatic self-recording magnetic flux meter and calculating the coercive force from this curve.

(iv) Wear Amount

The thin amorphous alloy strip specimens were respectively cut to form magnetic head cores for a VTR, and the wear resistances of the heads were measured. Wear resistance was evaluated by observing the tape sliding surface of the magnetic head before and after a VTR cassette tape coated with $\gamma$-$Fe_2O_3$ was fed on the magnetic head for 500 hours, from the side surface by an optical microscope; and thereby obtaining wear amounts converted to that per 100 hours.

The compositions of the specimens and the measured values of magnetic properties were listed in Table.

As may be seen from Table, the crystallization temperatures of the amorphous alloys of Examples 1 to 4 were confirmed to be higher, by approx. 300° C., than those of the amorphous alloy containing no Hf. In addition, the magnetic properties and, particularly, the effective magnetic permeabilities μ' (5 MHz) of the specimens heat treated with gradual cooling of Examples 1 to 4 were not deteriorated, as compared to those of the Comparative Examples 1 to 5.

It was also confirmed that, when the amount of Si added approached 0, the saturation magnetic flux density had increased and the deterioration of the effective magnetic permeability, which is due to the gradual cooling, was not observed. In addition, it was also confirmed that the wear resistance was substantially improved due to the reduction of the amount of B added.

According to the present invention, as described above, a magnetic head using an amorphous alloy may be obtained, the magnetic properties of which are not influenced by glass bonding.

It is to be noted here that the Hf used in the amorphous alloys for the magnetic heads of Examples 5 to 7 were 99.8% pure; and, that, though such alloys are approx. 0.02% Zr in content, an impurity such as this (Zr) does not affect the advantages of the present invention. Even where Hf of relatively low purity (such as one which is 95% and is approx. 3% Zr in content) is employed, it has been confirmed that the advantages of the amorphous alloy according to the present invention can still be obtained.

What is claimed is:

1. An amorphous alloy for a magnetic head, comprising a composition formula represented as follows and having an magnetic permeability of at least 350 in 5 MHz and a coercive force lower than 0.05 Oe after being gradually cooled from 500° C. at a rate of 3° C. per minute:

$$Co_{100-T-X-Y-Z}Ni_THf_XB_YSi_Z,$$

where T, X, Y and Z respectively represent the atomic densities of elements Ni, Hf, B and Si, and satisfy the following inequalities of formulae (1) to (6), as follows:

$$0.75 \leq T \leq 14 \quad (1)$$

$$6 \leq X \leq 15 \quad (2)$$

$$3 \leqq Y \leqq 14 \quad (3)$$

$$0 \leqq Z \leqq 11 \quad (4)$$

$$3 \leqq Y+Z \leqq 13 \quad (5)$$

$$11 \leqq X+Y+Z \leqq 25 \quad (6).$$

2. The amorphous alloy for a magnetic head according to claim 1, wherein the Y factor satisfies the inequality of the following formula (7):

$$3 \leqq Y \leqq 8 \quad (7).$$

3. The amorphous alloy for a magnetic head according to claim 2, wherein the Z factor satisfies the inequality of the following formula (8):

$$0 \leqq Z \leqq 0.01 \quad (8).$$

4. A magnetic head with an amorphous alloy comprising the core, wherein the core is composed of an amorphous alloy having a composition formula represented as follows and having an magnetic permeability of at least 350 in 5 MHz and a coercive force lower than 0.05 Oe after being gradually cooled from 500° C. at a rate of 3° C. per minute:

$$Co_{100-T-X-Y-Z}Ni_THf_XB_YSi_Z,$$

where T, X, Y and Z respectively represent the atomic densities of elements Ni, Hf, B and Si, and satisfy the following inequalities of formulae (1) to (6), as follows:

$$0.75 \leqq T \leqq 14 \quad (1)$$

$$6 \leqq X \leqq 15 \quad (2)$$

$$3 \leqq Y \leqq 14 \quad (3)$$

$$0 \leqq Z \leqq 11 \quad (4)$$

$$3 \leqq Y+Z \leqq 13 \quad (5)$$

$$11 \leqq X+Y+Z \leqq 25 \quad (6).$$

5. The magnetic head with an amorphous alloy according to claim 4, wherein the Y factor satisfies the inequality of the following formula (7):

$$3 \leqq Y \leqq 8 \quad (7).$$

6. The magnetic head with an amorphous alloy according to claim 5, wherein the Z factor satisfies the inequality of the following formula (8):

$$0 \leqq Z \leqq 0.01 \quad (8).$$

* * * * *